INVENTORS
Horst Redlich &
Hans-Joachim Klemp

BY George H Spencer

ATTORNEY

INVENTORS
Horst Redlich &
Hans-Joachim Klemp

BY George H Spencer
ATTORNEY

INVENTORS
Horst Redlich &
Hans-Joachim Klemp
BY George H. Spencer
ATTORNEY

United States Patent Office 3,169,773

Patented Feb. 16, 1965

3,169,773
CONTROLLER

Horst Redlich, Berlin-Wilmersdorf, and Hans-Joachim Klemp, Berlin-Steglitz, Germany, assignors to Teldec Telefunken-Decca Schallplatten G.m.b.H., Hamburg, Germany Filed Aug. 31, 1961, Ser. No. 135,222
Claims priority, application Germany, Sept. 2, 1960, T 18,951
17 Claims. (Cl. 274—4)

The present invention relates generally to the recording art, and more particularly to the operation of transferring a recorded signal from a recording medium onto another recording medium or to other signal handling equipment.

In the recording art, when transferring a signal from one recording medium to another, control operations, i.e., setting the recording or playback controls for the process, such as adjusting the level control etc., must be done frequently. Such control operations must be performed when transferring an audio signal from a magnetic tape to a phonograph record as is done in the phonograph record industry, or transferring a signal of magnetically recorded audio signals to optically recorded audio signals such as is used in the movie industry, or in the playback operation of recorded signals through a radio transmitter. For example, when transferring an audio signal from a magnetic tape to a record, the height, center, and depth of the frequency range must be influenced or controlled at certain points, in order to keep these characteristics of the signal within certain predetermined ranges when being recorded, and the setting of the control elements must be adjusted several times. In stereophonic recording, the recording of both channels must be coordinated so that the newly produced recording will be of good quality.

With the usual manner of controlling the settings of the control elements, e.g., gain control, equalization, etc., for the recording operation, there is no assurance that the new recordings will be uniform. This is especially true if this transfer of the signal is to take place at different points and at different times, and if a large number of various adjustments or settings of the controls have to be made, which is frequently the case with the larger record manufacturers.

In the past, with such equipment as home magnetic sound recorders, a combination was provided for switching the equipment off under the control of the magnetic tape by using mechanically applied conducting contacts or photoelectric control. A control device is also known for transferring signals from an imperforate magnetic tape onto a perforate magnetic tape by applying initiation information onto the imperforate tape before effective recording has begun. This known device operates when the initiation information is sensed, and the drive of the perforate tape is thereby switched on so that at the beginning of effective recording, the drive of the perforate tape is already running synchronously with the drive of the imperforate tape.

There is another known device which is used in dictating machines and which is operated with magnetic signal carrying mediums wherein a magnetic sound recording apparatus is provided for recording dictation and another one is provided for recording corrections. Whenever it is necessary to make a correction, an indication is arranged on the dictation carrier medium and the correction is spoken into the correction apparatus. During transcribing or playback the indication on the dictation carrier medium initiates switching in of the correction carrier medium.

In the field of phonograph record equipment, e.g., such as record changers, controls for changing conditions and switching equipment on and off in functional dependence on marking indications, are already known. For example, a record changer is known which is provided for the playback of records requiring different rotational speeds. The disk to be played is provided with markings or indications corresponding to the rotational speed at which this record is to be played, and these markings are scanned photoelectrically by the record changer. This scanning occurs before the disk drops onto the turntable and the turntable motor or gear drive is adjusted to the correct rotational speed for this disk by means of an amplifier and a relay.

However, in all of these known devices, only a single process or operation or setting, such as the switching on and off of a carrier medium feeding mechanism, can be controlled.

With these defects of the prior art in mind it is a main object of this invention to provide a control device which properly adjusts a multiplicity of settings for recording or playback apparatus and which in turn is controlled by suitable indications on the primary recording medium.

Another object of this invention is to provide for automatic control of the various settings during the transfer of a signal from one recording medium onto another, or during the playback of a recorded signal.

A further object of this invention is to provide a combination wherein the controls of a recorder used during the transfer of a signal from one medium to another, are automatically adjusted to a predetermined value in dependence upon the characteristics of the original or primary recording medium and which adjustment does not impair effective recording.

These objects and others ancillary thereto are accomplished according to preferred embodiments of the invention wherein a plurality of settings may be adjusted by means of adjacent contact carrying tracks or channels arranged on the front side of a tape and possibly also on the rear side. If desired each channel may be used a number of times for adjusting various settings through use of a sequential control. The term "sequential control" is understood to mean the multiple use of a stationary contact head with tracks of information following one another in the same channel. These consecutive information tracks are coordinated with control operations which may be mechanical or electrical. The change of the control of one setting to the control of another setting with information in the same channel may be performed with the use of a timing mechanism such as a time relay, a motorized timing device, or a timer, or by a throw-over contact on the tape.

The control operation is accomplished by using pulses which are synchronized with the power mains or power lines so as to avoid errors caused by a change in the power frequency. The number of these control pulses is fixed dependent upon the time required to proceed from a start pulse to the stop pulse. Since the magnetic sound recording apparatus is driven synchronously with the power lines, these power line synchronized pulses are necessary. Only two signals are needed for a control process, namely, a start pulse for switching in the control apparatus in the correct phase, and a stop pulse whose distance from the start pulse on the tape determines the number of pulses which will be provided during the control operation, and thus the amount of adjustment of each setting of the parameters which it is desired to control.

In order to avoid the effect of cumulative errors in several consecutive controls, for example when recording a collection of short selections on long playing records, all of the control members are first reset to their normal position, which in general will be the zero position, and this is effected by the start pulse mentioned above. To indicate satisfactory operation of the control members, the settings may be monitored by having the adjusted position reported and indicated by visual indicators, such as scales at the control members, or by telemetry through counter tubes, counting registers, or counter-printing devices.

The control information may be arranged on a portion of the magnetic tape which leads the portion containing the pertinent signal which is to be recorded. However, it is advisable to provide control information on the rear side of the tape which is unused so that the desired control of the settings may be accomplished even during effective recording.

The control information may be stored in the form of magnetic recordings disposed outside the transmission range. However, there is less expense and complexity if mechanical contacts are used, and the latter is therefore preferable.

Additional objects and advantages of the present invention will become apparent upon consideration of the following description when taken in conjunction with the accompanying drawings in which.

Figure 1:
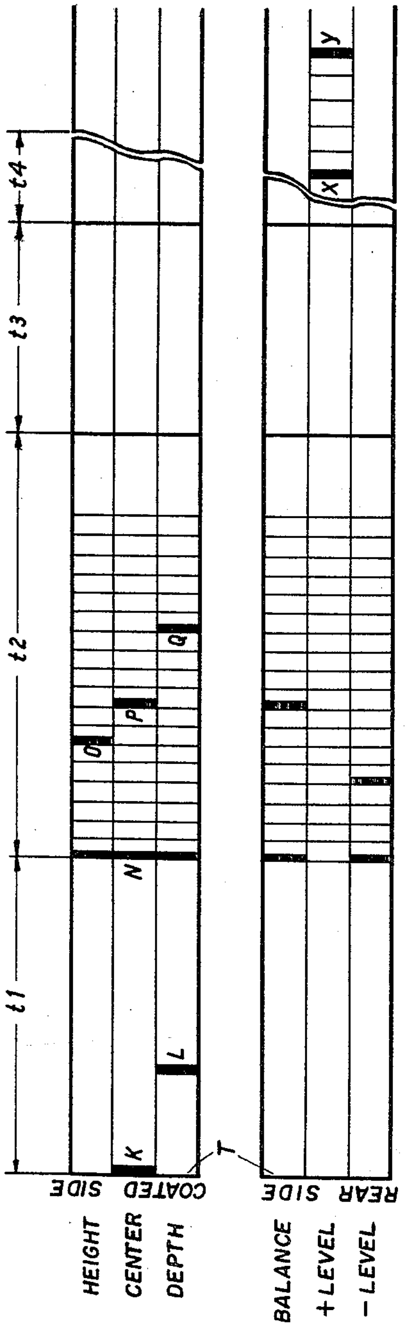
FIGURE 1 is a schematic enlarged view of the leading portion of the coated side and the rear side of the tape with the control information indicated thereon.

With more particular reference to the drawings, FIGURE 1 illustrates a first or primary recording medium or carrier T, which in this case is a magnetic tape. Three information channels are provided on each side of the tape, i.e., on the coated side and on the rear side. It is assumed that the signal is an audio signal containing recorded acoustic material which is to be transferred to a record. The control information is provided on the tape and is indicated by the dark areas in FIGURE 1, and comprises contact pieces or contacts placed onto the tape and which cooperate with a stationary contact head. In the leading portion of the tape, as illustrated, the initial control information is shown, which occupies a period of about three seconds.

Figures 2, 3:
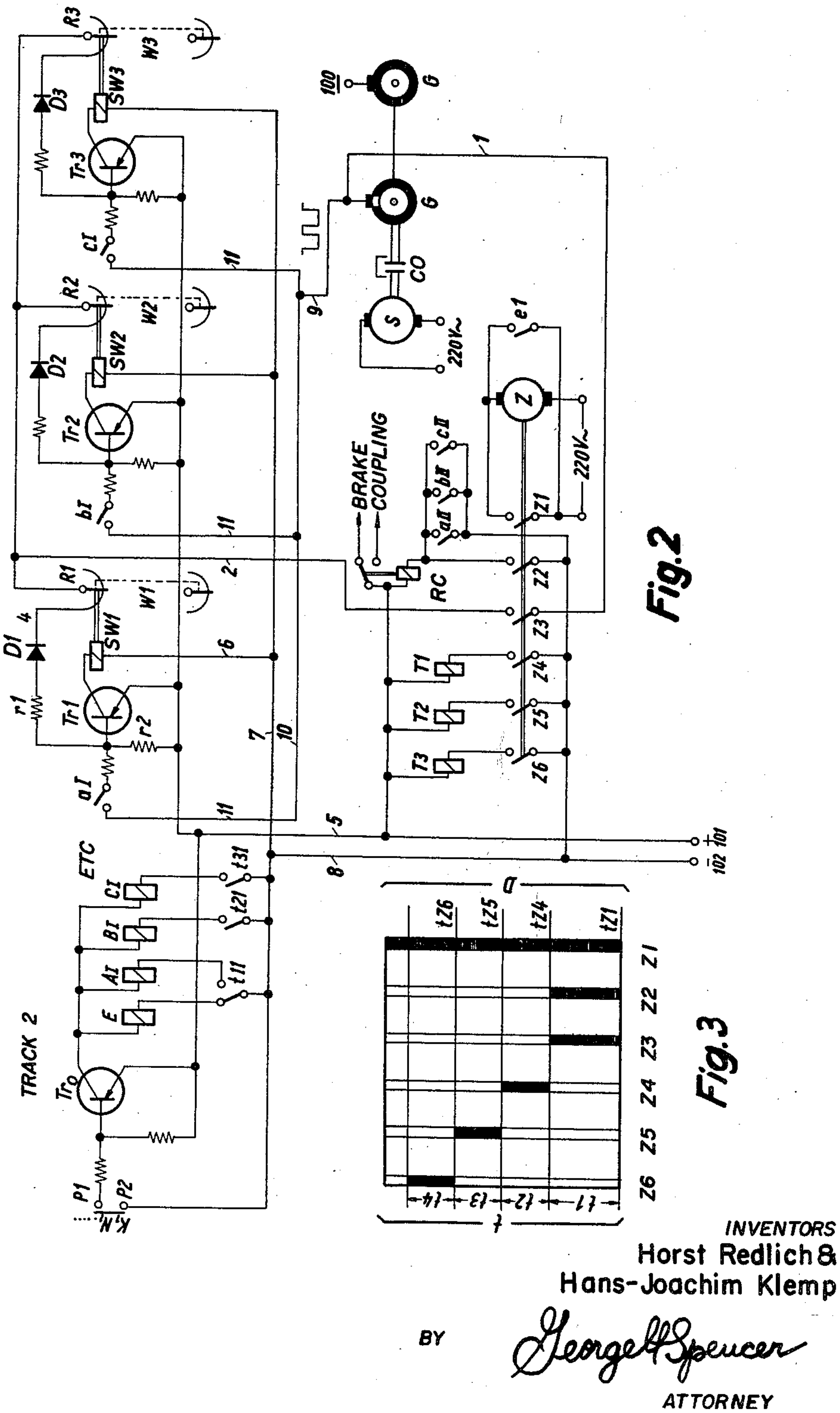
FIGURE 2 is a circuit diagram of the control circuit for the present invention.
FIGURE 3 is a timing chart of the operation of the timer.

As will be discussed in more detail below the adjustment of the settings of the individual circuits, such as by adjusting resistors and capacitors, is accomplished by means of conventional rotary selectors which are known in telephone technology. It is preferable to return the selectors to a normal or zero position before initiation of the actual control operation. A period of about 1.2 seconds is necessary for this purpose. To provide a margin of safety, a following region adjacent to the first region and of about 0.3 second's duration is provided, during which no control operations are triggered. The total of these two periods will be indicated by $t1$ in the following description, and is controlled by timer Z (FIGURE 2).

Contact piece K, which is disposed in the central channel of the coated side of the tape, provides the start signal for starting the timer which couples the pulsing device G or interrupter into the circuit as will be described in described in detail below. In addition, this contact may be used for other control operations which are required during the transferring operation independently of the present control device. Also, this signal effects resetting of the rotary selectors. The contact piece L disposed in the lower channel of the coated side of the tape may be used for initiating cutting of the lead in grooves on a phonograph record, for example.

At the expiration of time period $t1$ (1.5 seconds) the electrical processes or operations are triggered or signaled by contact piece N which is shown extending over the entire width of the coated side of the tape. The pulses generated by pulsing device G (FIGURE 2) are first switched to the circuit stages controlling the selectors which actuate the control members for adjusting the parameters such as the heights, the centers, and depths of the frequency range. These selectors are moved in stepwise fashion as long as pulses are provided from the pulsing device G to the selector actuating circuit stages. Contact pieces O, P, and Q are utilized for ceasing operation of a selector actuating circuit stage associated therewith.

For example, one rotary selector adjusts the recording or playback element of the circuit to be controlled which affects the high frequency range, and makes six steps before being stopped by contact piece O, which terminates adjustment of the high frequency range. The rotary selector W1 (FIGURE 2) for adjusting the setting for the centers of the frequency range makes eight steps before it is switched off by contact piece P. In a similar manner the rotary selector for adjusting the setting for influencing the depths makes twelve steps before it is stopped by contact piece Q.

In a similar manner the recording level or gain or output level may be adjusted in a positive sense (plus level) or in a negative sense (minus level) by the contact pieces arranged on the rear side of the tape (FIGURE 1). In this embodiment it is considered that the level must be adjusted in a negative sense at the start, which means that the original is too loud, and, during the course of recording, the level at one point must be increased (contact XY) since at this point the original recording was too weak. A balance adjustment is also provided which controls the equilibrium between the two channels of a stereophonic recording. The balance adjustment and the negative level adjustment are effected during time $t2$ fixed by the timer Z. This may very well be joined by a further time period $t3$, also fixed by timer Z, during which the control operations that are to be effected by the same channel and which are independent of the control operations already performed by this channel, are not effected. These second control operations are independent of the first control operations which took place in this channel during the time period $t2$.

With more particular reference now to FIGURE 2 an embodiment of a control means or control circuit is disclosed which has a sensing means in the form of a contact head including two conducting poles P1 and P2. The contact K on the tape initiates the control operation by connecting these poles P1 and P2 which are fixed in the apparatus. From FIGURE 2 it will be seen that when poles P1 and P2 are short-circuited transistor $Tr_0$ conducts and continues to conduct as long as the poles are short-circuited by contact K. Relay E is in the output circuit of transistor $Tr_0$ and is energized when this transistor conducts, via contact $t11$ which is a throw-over contact controlled by a relay T1 and which contact is normally in the position to the left as indicated in FIGURE 2. When relay E is energized, a control switch $e1$ is closed and this connects timer Z with the 220 volt A.C. line. This timer Z will switch in the contacts Z1, Z2 . . . Z6, in a manner which is prearranged and over a preselected time period.

Initially, contact Z1, which is a holding contact for timer Z is closed so that when relay E is deenergized, which occurs when contact piece K moves past the poles, the timer will remain energized. This contact will remain closed as long as it is desired for the motor to run. Simultaneously, contacts Z2 and Z3 are also closed. Contact Z2 energizes relay RC which controls switch contacts for controlling an electromagnetic coupling CO of pulsing device G. The operation of this coupling device will be described in detail below in connection with FIGURE 3. By means of coupling CO the pulsing device G is connected to rotate with its drive motor S.

The closing of contact Z3 prepares the circuit for resetting the rotary selectors W1, W2, W3, etc. Current from the positive terminal 101 is connected to conductor 5, resistor $r2$, the base of transistor T$r$1, resistor $r1$, diode rectifier D1, conductor 4, the reset path of rotary selector W1, through conductors 2 and 1, through pulsing device G, and to the negative terminal 100. Transistor T$r$1 therefore conducts and energizes the step-by-step actuating element SW1 of selector W1 from the positive terminal 101, through conductor 5, transistor T$r$1, through the collector of this transistor, to the step-by-step actuating element SW1, conductors 6, 7, and 8, and thence to the negative terminal 102. Since the conducting condition of the transistor T$r$1 is directly dependent upon a signal from the pulsing device, the transistor is alternately conducting and not conducting or conducting and blocked in accordance with the pulses, and the step-by-step actuating element SW1 of selector W1 receives stepping pulses in synchronism with this rhythm.

The actuating stages of the circuit for rotary selectors W2, W3, etc. are disposed in parallel to the circuit for selector W1 and accordingly the operation of these circuits is the same. All rotary selectors are reset to 0 independently of the position of their contact arms before the initiation of this operation. Since the contacts $a$I, $b$I, $c$I, etc. are open at this time, the parallel path from pulsing device G to the transistors T$r$1, T$r$2, T$r$3, etc. via conductors 9, 10, and 11 is open and has no effect.

At the termination of time period $t1$, which is dependent upon the arrangement of timer Z, and during which time the rotary selectors were reset to 0, timer Z opens the contacts Z2 and Z3 and closes contact Z4. Thus, the resetting circuit of the rotary selectors is interrupted when Z3 is opened, the pulsing device G is stopped when contact Z2 opens, and the time period $t2$ is initiated during which control operations, for example those of an electrical nature, will take place.

When contact Z4 is closed, relay T1 is energized, and its switch $t11$ is thrown over to the right so that relay AI is prepared to be energized. This relay is, in fact, energized when contact N short-circuits the poles P1 and P2. In the meantime the contact K has moved on from the poles P1 and P2 and relay E is deenergized. Contacts $a$I and $a$II are closed by the energization of relay AI. Relay AI is a stepping relay and therefore the contacts $a$I and $a$II will remain closed even when the contact N moves on, until a further contact such as contact P again connects poles P1 and P2. At this time the stepping relay AI is again excited and the contacts $a$I and $a$II are opened.

The adjustment of the parameter controls for the circuit elements to be controlled by rotary selectors W1, W2, etc. will now be described. Since contact $a$II is closed, the relay RC is energized and the coupling CO couples pulsing device G with its drive motor S. Contact $a$I is also closed and due to this parallel conducting path for the transistor, as mentioned above, the transistor T$r$1 conducts. The control pulsing voltage between positive terminal 101 and pulsing device G now appears at resistor $r2$. The current proceeds from positive terminal 101 through conductor 5, resistor $r2$, contact $a$I, conductors 11, 10, and 9, and pulsing device G, to the negative terminal 100. The pulses provided in the output circuit of transistor T$r$1 now cause the rotary selector W1 to move and thereby adjust the settings for the circuit to be controlled.

Assuming that contact P now connects or short-circuits the poles P1, P2 the relay AI is again excited and the contacts $a$I and $a$II are opened, the rotary selector W1 is stopped, and the pulsing device G is uncoupled from its motor S and braked. This terminates the control operation for the selector which adjusts the setting of, for example, the centers of the frequency range.

If further contact pieces are provided in the same channel on the tape, further control operations to be effected later on may be programmed on the tape. In this event, after the time period $t2$ has elapsed, contact Z4 is opened and contact Z5 closed by the timer Z at the beginning of time period $t3$. Closing contact Z5 energizes relay T2 which moves its contact $t21$ to the right and prepares the circuit to energize relay BI which controls selector W2. The further operation of this device corresponds to the preceding description relative to the operation of relay AI and therefore need not be repeated in detail. In the same manner the operations proceed during time period $t4$ for further control operations which may be controlled by programming contacts in the same tape channel by controlling relay CI whereby the selector W3 and the pertinent circuit are controlled. This operation may be continued with as many controllable elements as are needed or desired.

With more particular reference to FIGURE 3 a time diagram is illustrated wherein the timing of the closing of contacts Z1 through Z6 is indicated during time periods $t1$ through $t4$. The total time for the control of the switches is indicated by $t$ and the scale of particular instants during the operation is indicated by D. At instant $tz1$ when timer Z has just been switched on by contact $e1$ of relay E, switch Z1 is closed as are switches Z2 and Z3. Z1 remains closed during the entire period $t$. Contacts Z2 and Z3 effect the resetting operation of selectors W1, W2, etc. The resetting operation is completed before the end of time period $t1$ and contacts Z2 and Z3 are opened at the end of this period.

At instant $tz4$, when time period $t2$ begins, switch Z4 is closed by timer Z and relays T1 and AI are energized and selector W1 is actuated whereby the associated settings are adjusted. At instant $tz5$ when time period $t2$ has terminated, switch Z5 is closed and time period $t3$ begins. During this period the contacts which are control information means and disposed in the same channel, may control operation of relay BI and selector W2.

A similar operation takes place during time period $t4$ beginning at instant $tz6$, with respect to switch Z6, relays T3 and CI, as well as rotary selector W3.

In the described embodiment only the control operations effected by contact pieces in the same channel have been described, and which are distinguished from each other by the timer. As indicated in FIGURE 1 several information channels may be connected in parallel for simultaneous or alternate control of further operations, for example, mechanical operations necessary for the signal transferring operation. The stationary contact heads in the sound tape apparatus must be suitably arranged and designed.

It is advantageous for the pulses to be generated in synchronism with the power lines so that the number of pulses for the rotary selectors is determined by the time required for the magnetic tape to bring two spaced contact pieces into contact with the contact head, and because the magnetic tape apparatus is driven synchronously with the mains. Thus, it is necessary for the pulsing device to be reset to 0 after it is switched off, independently of the phase position in which the switching off was done. Only then is the number of control pulses which provides the timing for the control operation, unambiguously established.

Figure 4:
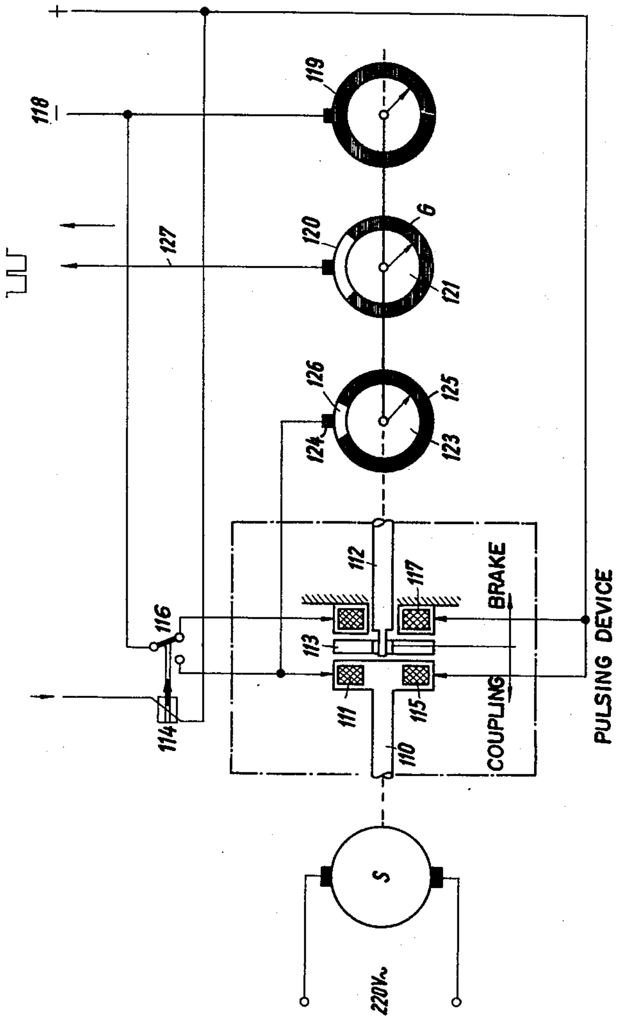
FIGURE 4 is a schematic diagram of the synchronous pulse generating section including the electromagnetic brake coupling.

With more particular reference to FIGURE 4 the pulsing device G is illustrated. Synchronous motor S drives the coupling half 111 of an electromagnetic coupling via the shaft 110. On the shaft 112 of the pulsing device G is a magnetic disk 113 which is splined thereto so as to be movable axially with respect thereto but fixed in the rotational sense. When relay 114 is energized, which relay corresponds to relay RC of FIGURE 2, the winding 115 of the coupling half 111 of the electromagnetic coupling is excited and the disk 113 is drawn toward and against the winding 115, whereby shaft 112 will rotate with disk 113 which rotates with the coupling half 111. When relay 114 is deenergized contact 116 is moved to the right, thereby energizing the stationary brake winding 117. Disk 113 is then uncoupled from the coupling half 111 and is drawn toward winding 117 to brake and stop the shaft 112.

Pulses are generated by feeding the current from negative terminal 118 to commutator ring 119, from which it is fed to the pulsing disk 121, which is provided with an insulating portion 120. The current passes along conductor 127, which corresponds to conductor 9 in FIGURE 2, and through the control circuits, to the positive terminal 101. The passage of this current flow is periodically interrupted by insulating portion 120.

To assure that the pulsing device always stops at the 0 position after the device is switched off, a parallel path for relay 114 is provided through contact disk 123 so that winding 115 remains energized even when relay 114 is switched off (contact 116 is to the right) as long as brush 124 contacts the conducting portion 125 of contact disk 123. Only when the insulating portion 126 is disposed beneath brush 124, will the circuit for winding 115 be interrupted. Under these conditions the energization of winding 117 will become effective. Disk 113 then moves in axial direction toward the brake winding 117 to stop the pulsing device G instantaneously.

In the embodiment shown and described, mechanical or physical contact pieces are provided on the tape for triggering the control operations. It is also possible to provide other information or control means for initiating the control operations. For example, colored information signs may be provided on the audio carrier, and a photoelectric scanning means used in adjacent channels to distinguish one color from another and which may be produced by the interposition of filters.

It will be understood that the above description of the present invention is susceptible to various modifications, changes, and adaptations, and the same are intended to be comprehended within the meaning and range of equivalents of the appended claims.

What is claimed is:

1. A device for simplifying a transfer operation of a signal from a first recording medium to a second recording medium by automatically controlling the recording settings, comprising, in combination: a plurality of means for setting the recording controls of a recording device for recording the signal on the first medium onto the second medium; control means for actuating said setting means; and a first recording medium including selectively arranged information means provided in dependence upon the characteristics of the signal thereon for operating said control means, said control means including means for sensing said information means to operate said control means and actuate said setting means and consequently setting the recording controls of a recording device for the second medium in dependence upon the characteristics of the signal on said first recording medium, said information means being contact pieces arranged in channels, one of said setting means being provided for each recording control of a recording device for recording the signal on the first medium onto the second medium, said control means including a multi-stage circuit having an actuating stage for each setting means, a switching stage for connecting the various circuit stages in preselected arrangements, and a timer for operating said switching stage to prepare the actuating stages for operation individually so that the contact pieces in one channel may be used for different control operations.

2. A device as defined in claim 1, wherein said control means includes a first relay having a contact which is closed thereby, said contact being arranged to actuate said timer, and said first relay being given the start signal by being energized by a first of said contact pieces.

3. A device as defined in claim 2, wherein said switching stage operated by said timer initially closes a switch which is a self holding switch for the timer so that the timer may operate after said first relay has been de-energized.

4. A device as defined in claim 1, wherein said timer is arranged initially to operate a portion of the switching stage which resets said setting means to zero.

5. A device for simplifying a transfer operation of a signal from a first recording medium to a second recording medium by automatically controlling the recording settings, comprising, in combination: a plurality of means for setting the recording controls of a recording device for recording the signal on the first medium onto the second medium; control means for actuating said setting means; and a first recording medium including selectively arranged information means provided in dependence upon the characteristics of the signal thereon for operating said control means, said control means including means for sensing said information means to operate said control means and actuate said setting means and consequently setting the recording controls of a recording device for the second medium in dependence upon the characteristics of the signal on said first recording medium; and a pulsing device, said setting means including rotary selectors actuated stepwise by said pulsing device, said control means including a resetting section selectively connectable with said pulsing device for a sufficient time period for the pulses to reset said selectors.

6. A device as defined in claim 5, comprising a timer, said control means including a circuit controlled by said timer, said resetting section connecting the selectors with said pulsing device via said circuit to feed the pulses from said device to the stepwise actuated selectors.

7. A device for simplifying a transfer operation of a signal from a first recording medium to a second recording medium by automatically controlling the recording settings, comprising, in combination: a plurality of means for setting the recording controls of a recording device for recording the signal on the first medium onto the second medium; control means for actuating said setting means; and a first recording medium including selectively arranged information means provided in dependence upon the characteristics of the signal thereon for operating said control means, said control means including means for sensing said information means to operate said control means and actuate said setting means and consequently setting the recording controls of a recording device for the second medium in dependence upon the characteristics of the signal on said first recording medium, said control means including (1) holding relays, (2) a circuit having an actuating stage for each setting means, and (3) a pulsing device for generating control pulses, each actuating stage including (1) a transistor, (2) a setting means actuating element operable in a step-by-step manner, and (3) a first contact in the input section of each transistor and closed and opened by one of said holding relays to connect and disconnect, respectively, the pulsing device with the base of the associated transistor so the transistor conducts and is blocked, respectively, in synchronism with the control pulses, said actuating element associated therewith being connected in the output section of said transistor, whereby said element actuates said setting means associated therewith in a step-by-step manner.

8. A device as defined in claim 7, wherein said circuit includes a second contact for each actuating stage closed and opened by said one relay for starting and stopping, respectively, the operation of said pulsing device.

9. A device as defined in claim 8, wherein said pulsing device includes a synchronous motor and an interrupter energized by the same power lines, and an electromagnetic brake coupling controlled by said second contacts for mechanically connecting said motor and said interrupter to operate in synchronism.

10. A device for simplifying a transfer operation of a signal from a first recording medium to a second recording medium by automatically controlling the recording settings, comprising, in combination: a plurality of means for setting the recording controls of a recording device for recording the signal on the first medium onto the second medium; control means for actuating said setting means; and a first recording medium including selectively arranged information means provided in dependence upon the characteristics of the signal thereon for operating said control means, said control means including means for sensing said information means to operate said control means and actuate said setting means and consequently setting the recording controls of a recording device for the second medium in dependence upon the characteristics of the signal on said first recording medium, said control means including pulse responsive sections for actuating said setting means in a step-by-step manner, and a plusing device connectable with said sections and controlled by said control means for generating control pulses, said pulsing device being arranged to cease operations only during a pause between pulses regardless of the phase position of the pulse at the time the control means signals said pulsing device to stop.

11. A device as defined in claim 10, wherein said pulsing device includes a motor and an interrupter, an electromagnetic coupling for connecting said interrupter to said motor, said interrupter including a pulsing disk and an auxiliary disk electrically connected together and both rotatable synchronously with said motor, a relay for operating said coupling, said auxiliary disk having an insulated portion and being connected to maintain the energization of the electromagnetic coupling independently of the opening of said relay, until the interrupter has attained its rest position wherein the insulating portion of said auxiliary disk deenergizes said coupling.

12. A device as defined in claim 10, wherein said pulsing device includes a motor and an interrupter, an electromagnetic brake coupling for connecting said interrupter to said motor, said coupling including a rotatable shaft connected to said motor, a rotatable shaft connected to said interrupter, a coupling winding on said motor shaft, a stationary braking winding spaced from said coupling winding, and a magnetic disk rotatable with said interrupter shaft but axially movable with respect thereto and between said windings so that when said coupling winding is energized said disk is magnetically attracted thereto and said disk and thus said interrupter shaft are effectively connected to said motor shaft, and when said stationary braking winding is energized said disk is magnetically attracted thereto and said disk and thus said interrupter shaft are stopped.

13. A device for simplifying a transfer operation of a signal on a recording medium from a first electronic device to a second electronic device by automatically controlling the settings of the second device, comprising, in combination: means for setting each of at least some of the controls of a second electronic device into a selected one of more than two positions; control means for actuating said setting means into a selected position; and a recording medium including selectively arranged information means provided in dependence upon the characteristics of the signal thereon for operating said control means, to thereby influence said control means and thus said setting means for placing controls into a selected position, said control means including means for sensing the arrangement of said information means to operate said control means and actuate said setting means in dependence upon the arrangement of said information means to place the controls into a selected position.

14. A device for simplifying the reproduction operation of a signal on a recording medium by automatically controlling the settings of reproduction apparatus having variable controls, comprising, in combination: a plurality of means for setting variable controls of reproduction apparatus; means for actuating said setting means; and a recording medium having selectively arranged information means including, for each setting means, two indicators spaced apart a distance representative of the desired setting for operating said actuating means, said distance being dependent upon the characteristics of the signals on said recording medium, said actuating means including means for sensing said information means and the distance between the indicators for operating said actuating means an amount depending upon said distance to thus actuate said setting means correspondingly and consequently setting the controls of a reproduction apparatus in dependence upon the characteristics of the signals on said recording medium.

15. A device as defined in claim 14, wherein said sensing means includes a stationary contact head, and said indicators are conducting contact pieces which initiate the control operation by cooperating with said stationary contact head.

16. A device as defined in claim 14, wherein said sensing means are photoelectric scanning means, colored signs and said indicators being arranged on the first recording medium, whereby the individual information is arranged in channels distinguishable from one another by the varying color sensitivity of the photoelectric scanning means.

17. In a device for simplifying the reproduction operation of a signal on a recording medium by automatically controlling a setting of reproduction apparatus having a variable control and for use with a recording medium having selectively arranged information means including two indicators spaced apart a distance representative of the desired setting with the distance being dependent upon the characteristics of the signal on the recording medium, the improvement comprising: means for setting a variable control of reproduction apparatus; and means for actuating said setting means including means for sensing the information means and the distance between the indicators for operating said actuating means an amount depending upon said distance to thus actuate said setting means correspondingly and consequently setting the control of a reproduction apparatus in dependence upon the characteristics of the signals on the recording medium.

References Cited in the file of this patent

UNITED STATES PATENTS

| | | |
|---|---|---|
| 2,527,463 | Sziklai | Oct. 24, 1950 |
| 2,706,638 | Bruderlin et al. | Apr. 19, 1955 |
| 2,764,639 | Holt | Sept. 25, 1956 |
| 2,976,372 | Sampson | Mar. 21, 1961 |
| 3,005,057 | Locklin | Oct. 17, 1961 |

FOREIGN PATENTS

| | | |
|---|---|---|
| 571,250 | Germany | Feb. 25, 1933 |